Patented Mar. 7, 1939

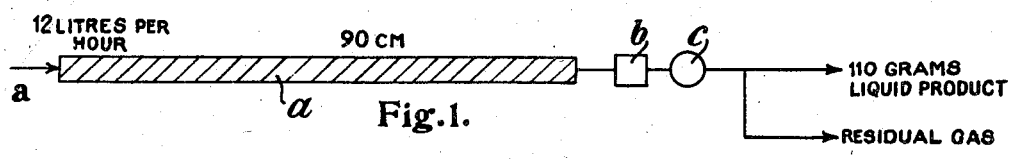
Fig.1.
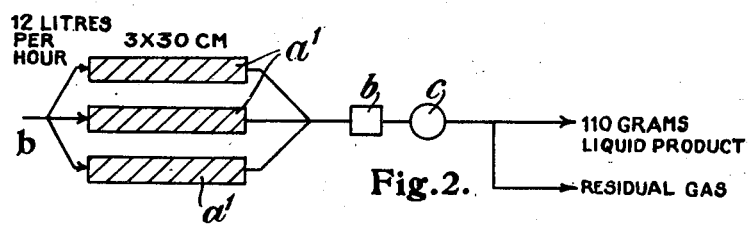
Fig.2.
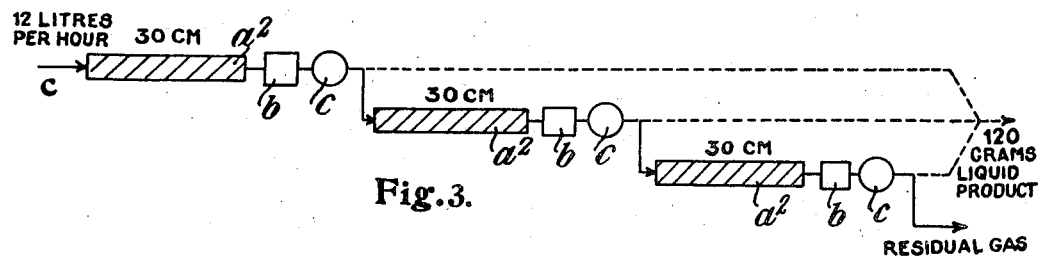
Fig.3.
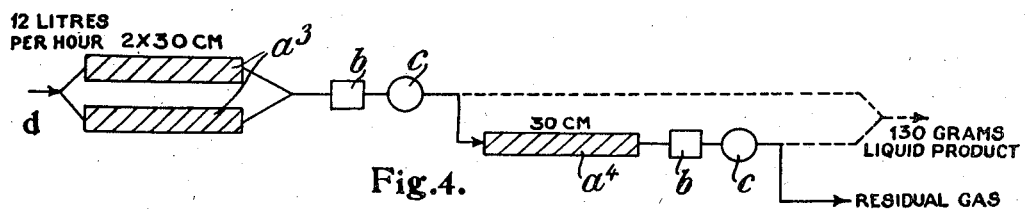
Fig.4.
DESIGNATION
SEPARATION OF WATER AND OIL – 
ACTIVE CARBON – 

2,149,515

UNITED STATES PATENT OFFICE

2,149,515

METHOD OF INCREASING YIELD IN THE CATALYTIC SYNTHESIS OF ALIPHATIC HYDROCARBONS

Franz Fischer, Mulheim, Ruhr, Germany, assignor to Studien- und Verwertungsgesellschaft mit beschrankter Haftung, Mulheim, Ruhr, Germany Application April 15, 1935, Serial No. 16,453
In Germany April 25, 1934

5 Claims. (Cl. 260—449)

It is known that the catalytic synthesis of aliphatic hydrocarbons from the oxides of carbon and from hydrogen can be effected by reason of the fact that when the gas mixture is of a suitable composition, for example, 1 part of carbon monoxide and 2 parts of hydrogen, all the carbon monoxide can be converted into hydrocarbons by being once taken over a good contact substance, for example, at 190° C., and at a not too great velocity. This synthesis of the hydrocarbons from carbon monoxide and hydrogen thus differs fundamentally from the synthesis of ammonia, where at the necessary relatively high reaction temperature, for reasons of chemical balance, always only one part of the mixture of nitrogen and hydrogen can be converted into ammonia. Here, accordingly, while removing the reaction products, the process must be carried out in a number of stages, and this is effected in practice by circulating over the contact substance. The carrying out of the synthesis of hydrocarbons from carbon monoxide and hydrogen in the manner hereinbefore described, in which the whole carbon monoxide is at once converted in a single stage into hydrocarbons, has however the disadvantage that a relatively large quantity of such hydrocarbons as can be liquefied only under pressure is particularly formed of methane.

It has further been found that there is a much greater yield of aliphatic hydrocarbons which contain more than one carbon atom in the molecule (more particularly liquid hydrocarbons which readily volatilise), if the method is carried out in at least two stages and, in between, either the oil, that is to say, the liquid hydrocarbons produced by synthesis and having higher boiling points and a greater specific gravity than benzine, or the reaction water alone, or, in addition, benzine and the hydrocarbons that boil at a still lower temperature, are removed from the gas, care being taken during the early stages, by operating at specially low temperatures within the specified range, or by maintaining a high velocity, or by having insufficient hydrogen, that is to say, by the use of a mixture of carbon monoxide and hydrogen containing less than two parts by volume, but not less than one part by volume of hydrogen to one part by volume of carbon monoxide or by any combination of these conditions, to ensure that the mixture of carbon monoxide and hydrogen present is not completely consumed but only to the extent of, for example, one-half or two-thirds. By this means the generation of heat within the contact substance is clearly limited, and thus the consumption of the mixture of carbon monoxide and hydrogen is arrested in the direction of the undesirable formation of methane. The process is carried out also in the further stages with the same effect, and only in the last stage is the residue of carbon monoxide and hydrogen, where desired, completely converted.

The dividing up of the synthesis of hydrocarbons from carbon monoxide and hydrogen in stages with the intermediate removal of reaction products thus leads to the practical result that there is an increase in yield of the desired hydrocarbons of 20% and over until nearly the theoretical limit is reached, which is not possible of attainment in a single stage, however carefully the work is carried out. Operating in stages, however, without removal of the reaction product has previously been described in connection with the synthetic production of methane from oxides of carbon and hydrogen; there has also been described a method of effecting in the use of catalysts the complete conversion of hydrogen and of oxides of carbon into liquid aliphatic hydrocarbons by removing the liquid hydrocarbons produced in one stage but re-converting the undesirable hydrocarbons into carbon monoxide and hydrogen by the use of steam or carbon dioxide or both at a high temperature, and then converting the gas mixture produced into hydrocarbons in the same or in a new contact stage, and so on.

The present invention has nothing in common with the two methods hereinbefore described. It can be carried out as a cyclic process with one or more contact stages, although this is not essential, the gases leaving the cycle, after removal of reaction products, being completely converted in a further stage.

In the accompanying diagrammatic drawings there are illustrated several of the methods of carrying out the invention as hereinafter described.

Figure 1 illustrates the use of a single contact layer of extended length.

Figure 2 illustrates the use of three contact layers disposed in parallel.

Figure 3 illustrates the use of three contact layers disposed in succession.

Figure 4 illustrates the use of three contact layers, two of which are disposed in parallel and the third of which is used as a succeeding stage.

Example I

Figure 5:
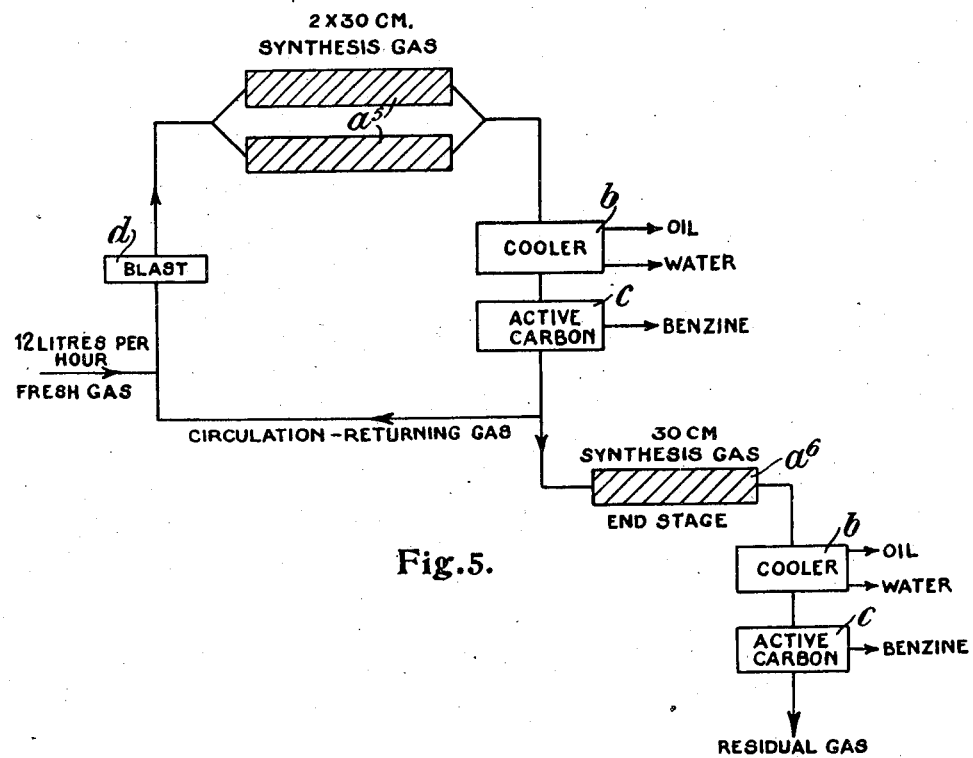
Figure 5 illustrates a further modification in the carrying out of the invention.

Referring to Figure 1 of the accompanying drawings, 12 litres of a gas mixture (one part of CO plus two parts of $H_2$) are passed every hour over a contact layer $a$ of a length of 90 cms. (12 grammes of cobalt) at a temperature of 190° C.; the gas mixture passing away from the contact layer $a$ is treated at $b$ for the separation of water and oil and at $c$ is passed over activated carbon; the product contains up to 110 grammes of benzine plus oil per cubic metre at normal temperature and pressure.

As illustrated in Figure 2, by using three contact layers $a^1$ of a length of 30 cms. (each layer 4 grammes of cobalt) disposed in parallel and passing over each contact layer 4 litres of gas per hour at a temperature of 190° C., the product again contains up to 110 grammes of benzine plus oil per cubic metre of gas at normal temperature and pressure. The gas mixture passing from the contact layers $a^1$ may be passed in common through apparatus $b$ for the removal of water and oil and over activated carbon at $c$.

If, as represented in Figure 3, 12 litres of gas be passed every hour over the three contact layers $a^2$ of a length of 30 cms. (each layer 4 grammes of cobalt) in succession and, after passing each layer, the reaction products, oil and water, be removed as at $b$ and benzine, at $c$, the temperature of the layers being so selected that in each stage no more than one-third of the original carbon monoxide is converted—the product contains up to 120 grammes of oil plus benzine per cubic metre at normal temperature and pressure.

If, as represented in Figure 4, 12 litres of gas be passed every hour over two contact layers $a^3$ of a length of 30 cms. (each layer 4 grammes of cobalt) disposed parallel to each other and the gas is then passed over a contact layer $a^4$ of a length of 30 cms. disposed to the rear of the other two contact layers, the temperature selected being such that in each layer approximately the same volume of carbon monoxide is converted and then oil and water and benzine are removed respectively at $b$ and $c$ after each layer, the total product contains up to 130 grammes of benzine plus oil per cubic metre at normal temperature and pressure.

It is possible by this method to work with lower temperatures in the first stages, and as a result there is a better yield of liquid hydrocarbons at the expense of the gaseous hydrocarbons which are otherwise produced.

*Example II*

The temperature is not the same in all the various stages, but is lowest in the first stage and highest in the last. The light benzine and the hydrocarbons which boil at a lower temperature are removed between the several stages, for example by washing with cold oil, or by the use of active carbon, or by other methods.

*Example III*

The same procedure is followed as in Example II except that after each stage all the desired reaction products are removed, the oil being removed by washing with circulating washing oil having a temperature of over 100° C., the water by washing with water, the benzine by washing with cold oil, and the unsaturated gaseous hydrocarbons by washing with suitably concentrated sulphuric acid and the saturated gaseous hydrocarbons by treatment with active carbon.

*Example IV*

Complete conversion of the carbon monoxide in the early stages is avoided if an insufficient quantity of hydrogen is present, and after the different stages so much hydrogen, or gas containing a high percentage of hydrogen, be then added to the remaining gas, as will limit the conversion. Only before the last stage is the amount of hydrogen required for complete conversion added. The reaction products are removed between the several stages. The method of working Example IV is applicable when it is desired to secure as large a yield as possible of unsaturated hydrocarbons.

The process hereinbefore described and explained by means of examples of increasing the yield of aliphatic hydrocarbons which contain more than one carbon atom in the molecule, can be carried out at atmospheric pressure or at higher or lower pressures than atmospheric pressure.

As a further example of the application of the invention there is illustrated in Figure 5 the carrying out of a method according to which 12 litres of gas mixture are passed every hour into a circuit wherein under the action of a blast $d$ the gas is caused to traverse two contact layers $a^5$ disposed in parallel and each of a length of 30 cms. and thence after removal of oil and water at $b$ and the removal of the benzine at $c$ the gas is in part passed to an end stage comprising a further contact layer $a^6$, 30 centimetres in length, and is in part returned for re-circulation over the contact layers $a^5$. The gas passing over the contact layer $a^6$ is finally treated for the removal of oil and water at $b$ and the removal of benzine at $c$ before being treated as the final product.

I claim:

1. A method of increasing the yield in the catalytic synthesis of aliphatic hydrocarbons having more than one carbon atom in the molecule, from carbon monoxide and hydrogen, in which the synthesis is carried out in a number of stages, consisting in effecting partial conversion of the mixture of carbon monoxide and hydrogen in the first stage to the extent of less than ⅔ the available quantity, removing the reaction products and subsequently subjecting the mixture of carbon monoxide and hydrogen to partial conversion in the succeeding stages, each time after separation of the reaction products, and completing the conversion in the final stage.

2. A method according to claim 1, wherein the partial conversion is effected by the use of temperatures lying below the optimum conversion temperature.

3. A method according to claim 1, wherein the partial conversion is carried out by the use of a content of hydrogen that is deficient with respect to the content of hydrogen with which greater conversion can be secured by carrying out the operation in a single reaction.

4. A method according to claim 1, wherein the partial conversion of the mixture of carbon monoxide and hydrogen is effected in the individual stages by the use of high speeds of flow of the gas mixture.

5. A method according to claim 1, consisting in partially converting the mixture of carbon monoxide and hydrogen in one of the early stages by the use of a temperature lying below the optimum conversion temperature, removing the condensible reaction products and bringing the conversion of the mixture of carbon monoxide and hydrogen to a conclusion in the further stages by raising the temperature so that the optimum conversion temperature is attained in the last stage.

FRANZ FISCHER.